US008180682B2

(12) United States Patent (10) Patent No.: US 8,180,682 B2
Narayanaswami et al. (45) Date of Patent: May 15, 2012

(54) SYSTEM AND METHOD FOR GENERATING A VIEW OF AND INTERACTING WITH A PURCHASE HISTORY

(75) Inventors: Chandrasekhar Narayanaswami, Wilton, CT (US); Alpana Tiwari, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/243,807

(22) Filed: Oct. 1, 2008

(65) Prior Publication Data

US 2010/0082454 A1 Apr. 1, 2010

(51) Int. Cl.
*G06Q 30/00* (2012.01)
*G06Q 20/00* (2012.01)
(52) U.S. Cl. ..... 705/26.1; 705/16; 705/26.41; 705/26.5; 705/26.61; 705/26.63
(58) Field of Classification Search ............... 705/22–28
See application file for complete search history.

(56) References Cited

U.S. PATENT DOCUMENTS

| | | | |
|---|---|---|---|
| 6,883,708 B1* | 4/2005 | Fiedler et al. | 235/380 |
| 2001/0029484 A1* | 10/2001 | Schultz et al. | 705/39 |
| 2002/0073043 A1* | 6/2002 | Herman et al. | 705/64 |
| 2002/0147645 A1* | 10/2002 | Alao et al. | 705/14 |
| 2003/0018578 A1* | 1/2003 | Schultz | 705/39 |
| 2003/0033272 A1* | 2/2003 | Himmel et al. | 707/1 |
| 2006/0197763 A1* | 9/2006 | Harrison et al. | 345/441 |
| 2007/0164106 A1* | 7/2007 | McDevitt et al. | 235/383 |
| 2007/0179792 A1* | 8/2007 | Kramer | 705/1 |
| 2007/0208740 A1* | 9/2007 | Nye | 707/6 |
| 2007/0288437 A1* | 12/2007 | Xia | 707/3 |
| 2008/0104532 A1* | 5/2008 | Stambaugh | 715/771 |
| 2008/0109756 A1* | 5/2008 | Stambaugh | 715/835 |
| 2009/0300528 A1* | 12/2009 | Stambaugh | 715/764 |
| 2010/0030578 A1* | 2/2010 | Siddique et al. | 705/3 |

FOREIGN PATENT DOCUMENTS

WO WO 2007030897 A1 * 3/2007

\* cited by examiner

*Primary Examiner* — Ig T An
(74) *Attorney, Agent, or Firm* — McGinn Intellecutal Property Law Group, PLLC

(57) ABSTRACT

A system for generating a view of a purchase history, includes an electronic receipt generator for generating an electronic receipt including information regarding a purchase by a customer, a storage device for storing the electronic receipt, and a display screen generator which accesses the electronic receipt in the storage device to generate a display screen which displays a map corresponding to the information included in the electronic receipt.

23 Claims, 13 Drawing Sheets

```
<xsd:include schemaLocation="NewLineItem.xsd"/>
<xsd:complexType name="NewReceipt">
  <xsd:sequence>
    <xsd:element minOccurs="0" name="VendorName" type="xsd:string"/>
    <xsd:element minOccurs="0" name="VendorAddress" type="xsd:string"/>
    <xsd:element minOccurs="0" name="VendorPhone" type="xsd:string"/>
    <xsd:element minOccurs="0" name="CustomerID" type="xsd:string"/>
    <xsd:element minOccurs="0" name="GeocodeLatitude" type="xsd:string"/>
    <xsd:element minOccurs="0" name="GeocodeLongitude" type="xsd:string"/>
    <xsd:element minOccurs="0" name="ReceiptType">
      <xsd:simpleType>
        <xsd:restriction base="xsd:string">
          <xsd:enumeration value="Customer"/>
          <xsd:enumeration value="Gift"/>
        </xsd:restriction>
      </xsd:simpleType>
    </xsd:element>
    <xsd:element minOccurs="0" name="ReceiptVisibility">
      <xsd:simpleType>
        <xsd:restriction base="xsd:string">
          <xsd:enumeration value="Public"/>
          <xsd:enumeration value="Private"/>
          <xsd:enumeration value="Limited"/>
        </xsd:restriction>
      </xsd:simpleType>
    </xsd:element>
    <xsd:element minOccurs="0" name="TransactionTime" type="xsd:string"/>
    <xsd:element minOccurs="0" name="Annotation" type="xsd:string"/>
    <xsd:element minOccurs="0" name="LineItems" type="bons0:NewLineItem" maxOccurs="unbounded"/>
  </xsd:sequence>
</xsd:complexType>
```

FIG. 3    300

```
<xsd:complexType name="NewLineItem">
  <xsd:sequence>
    <xsd:element minOccurs="0" name="LineItemID" type="xsd:string"/>
    <xsd:element minOccurs="0" name="LineItemDesc" type="xsd:string"/>
    <xsd:element minOccurs="0" name="LineItemPrice" type="xsd:double"/>
    <xsd:element minOccurs="0" name="LineItemQuantity" type="xsd:string"/>
    <xsd:element minOccurs="0" name="Discount" type="xsd:string"/>
    <xsd:element minOccurs="0" name="ManufacturerInfo" type="xsd:string"/>
    <xsd:element minOccurs="0" name="ManufactureLocationLongitude" type="xsd:string"/>
    <xsd:element minOccurs="0" name="ManufactureLocationLatitude" type="xsd:string"/>
    <xsd:element minOccurs="0" name="ProductInfo" type="xsd:string"/>
    <xsd:element minOccurs="0" name="ProductInfoDetailURL" type="xsd:string"/>
    <xsd:element minOccurs="0" name="Annotation" type="xsd:string"/>
  </xsd:sequence>
</xsd:complexType>
```

FIG. 8
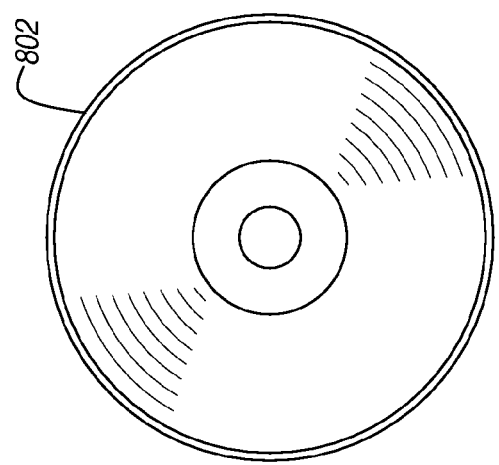
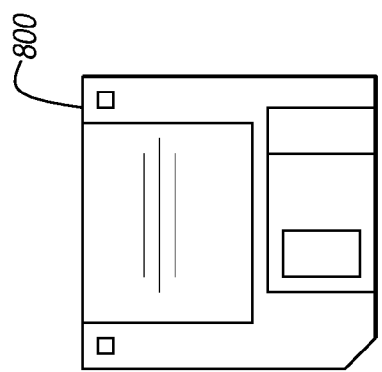

SYSTEM AND METHOD FOR GENERATING A VIEW OF AND INTERACTING WITH A PURCHASE HISTORY

BACKGROUND OF THE INVENTION

1. Field of the Invention

The present invention relates to a system for generating a view of a purchase history, and more particularly, a system for generating a view of a purchase history which includes an electronic receipt generator for generating an electronic receipt including information regarding a purchase by a customer.

2. Description of the Related Art

The advent of electronic media has facilitated electronic commerce and the use of electronic devices to conduct, record, and transmit commercial transactions. Customers are increasingly relying on using electronic media to provide access to commercial information including but not limited to advertising, sales records and the like.

However, currently there is now way to view purchase history across vendors by geography on a graphical user interface such as a map. Customers have to infer the information. There are no known solutions to the problem at this time.

SUMMARY OF THE INVENTION

In view of the foregoing and other problems, disadvantages, and drawbacks of the aforementioned conventional systems and methods, the exemplary aspects of the present invention An exemplary aspect of the present invention is directed to a system for generating a view of a purchase history. The system includes an electronic receipt generator for generating an electronic receipt including information regarding a purchase by a customer, a storage device for storing the electronic receipt, and a display screen generator which accesses the electronic receipt in the storage device to generate a display screen which displays a map corresponding to the information included in the electronic receipt.

Another exemplary aspect of the present invention is directed to a method of generating a view of a purchase history. The method includes generating an electronic receipt including information regarding a purchase by a customer, storing the electronic receipt in a storage device, and accessing the electronic receipt in the storage device to generate a display screen which displays a map corresponding to the information included in the electronic receipt.

The present invention also includes a programmable storage medium tangibly embodying a program of machine-readable instructions executable by a digital processing apparatus to perform the inventive method.

The invention may also include a computing infrastructure in which computer-readable code is integrated into a computing system, such that the code and the computing system combine to generate an electronic receipt including information regarding a purchase by a customer, store the electronic receipt in a storage device, and access the electronic receipt in the storage device to generate a display screen which displays a map corresponding to the information included in the electronic receipt.

With its unique and novel features, the present invention provides a system and method for viewing purchase history which is more efficient and convenient than conventional systems and methods.

BRIEF DESCRIPTION OF THE DRAWINGS

The foregoing and other objects, aspects and advantages will be better understood from the following detailed description of the embodiments of the invention with reference to the drawings, in which:

FIG. 3 illustrates an exemplary XML schema definition 300 of an electronic receipt, in accordance with an exemplary aspect of the present invention;

FIG. 4 illustrates an exemplary XML schema definition (e.g., XML markup) 400 for a line item, in accordance with an exemplary aspect of the present invention;

FIG. 8 illustrates a magnetic data storage diskette 800 and compact disc (CD) 802 that may be used to store instructions for performing the inventive method 500, in accordance with an exemplary aspect of the present invention.

DETAILED DESCRIPTION OF THE EMBODIMENTS OF THE INVENTION

Figure 1:
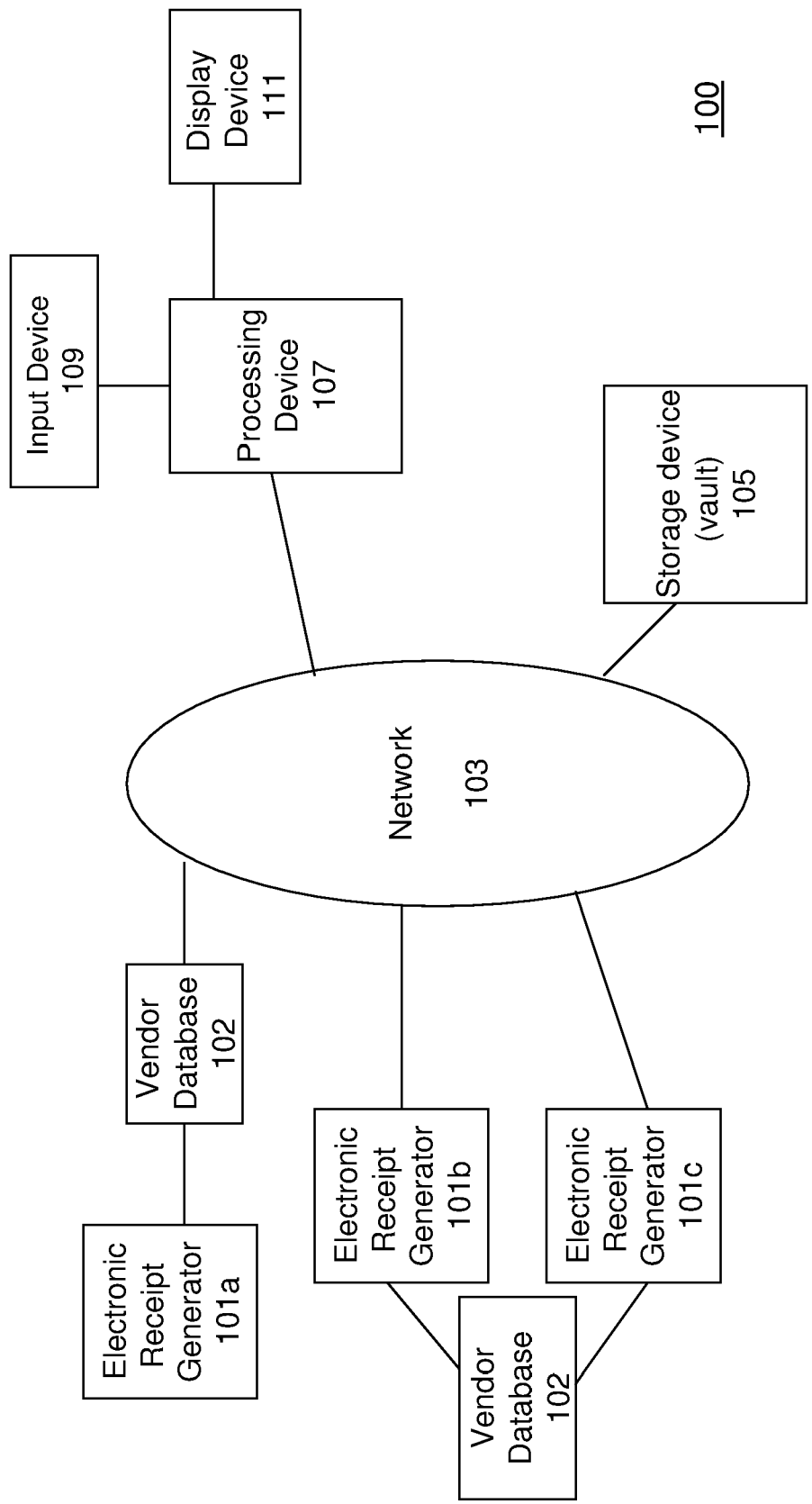
FIG. 1 illustrates a system 100 for generating a view of a purchase history, in accordance with an exemplary aspect of the present invention.

Referring now to the drawings, FIGS. 1-8 illustrate the exemplary aspects of the present invention.

Overview

FIG. 1 illustrates a system 100 for generating a view of a purchase history according to an exemplary aspect of the present invention. As illustrated in FIG. 1, the system 100 includes an electronic receipt generator (ERG) 101a-101b (e.g., plural electronic receipt generators) for generating a geocoded (have geocoded in parenthetic statement that follows) electronic receipt (e.g., plural of geotagged electronic receipts) including information regarding a purchase by a customer, a storage device 105 (e.g., electronic receipt vault) for storing the electronic receipt, and a display screen generator 107 (e.g., processing device) which accesses the electronic receipt in the storage device to generate a display screen which displays a map corresponding to the information included in the electronic receipt. The display screen may be part of a purchase history viewing tool which (e.g., receipt viewer) allows a user to conveniently view and interact with his purchase history.

It should be noted that although FIG. 1 shows only three ERGs 101a-101c, one network 103, one electronic receipt vault 105 and one processing device 107, this should not be construed as limiting. In fact, the system 100 may likely include thousands of ERGs, receipt vaults and processing devices connected through thousands of different networks.

The ERG 101a-101c may be physically located at the business (e.g., store) of one of more vendors which may be located at different locations throughout a city, state, country, continent, etc.

In particular, the ERG 101a-101c may be connected to a POS terminal (e.g., digital cash register) at a check-out counter in the vendor's store. Alternatively, the ERG 101a-101c may be connected to plural POS terminals at a vendor's store through the store's network (e.g., ethernet, local area network (LAN), wide area network (WAN), etc.). Alternatively, the ERG 101 may be located remotely (e.g., in a different city, state, country, continent, etc.) from the vendor's business, and connected (e.g., via wired or wireless communication link) to the vendor's POS terminals.

For example, when a customer makes a purchase (e.g., in-person at the vendor's store, or online via the Internet), an ERG 101a-101c of the vendor may generate an electronic receipt which includes information describing the purchase. Such information may include, for example, the vendor name, address of the store of purchase, items purchased, amount paid by the customer for the items purchased, and date of purchase. The electronic receipt may be generated in lieu of or in addition to a paper receipt which is conventionally provided to a customer at the time and place of purchase. The electronic receipt may be transmitted to the receipt vault 105 via a network 103 (e.g., the Internet). The receipt vault may be protected with standard authentication and access control mechanisms. Passwords may be used for authentication. Receipts may be made accessible to others, such as a group of people, for example—members of a family, employees in a business, or the general public, with a standard access control mechanism that is used for content sharing.

The system 100 may also include a vendor database 102 which is connected to the ERG 101a-101c and stores information for generating and/or updating the electronic receipts. In particular, the database 102 may store product-related information (e.g., rebate information, recall information, customer ratings, etc.) that may be used by the present invention (e.g., the receipt viewer) to update item information that may be included in an electronic receipt.

The database 102 may be connected to the network 103 (e.g., the Internet) and receive updating information for an item via the network 103. Alternatively, updating information (e.g., rebate information, recall information, price information, product origin information, etc.) may be manually input to the vendor database by a store employee using an input device (e.g., keyboard).

The ERG may be connected to the network 103 via the database 102 (e.g., ERG 101a). The database 102 may reside, for example, on the store's main database, or may be remotely stored and communicate with the ERG via a wireless connection. Further, assuming that the network 103 is the Internet, the database 102 may also include a feature for automatically and periodically (e.g., daily, weekly, monthly, etc.) searching for information on the worldwide web for updating the item information to include on the electronic receipt.

The system 100 may also include a processing device 107 (e.g., an electronic device such as a camera, mobile phone, desktop computer, laptop computer, handheld device, personal digital assistant (PDA), Blackberry device, etc.). which is connected to the network 103 (e.g., via wired or wireless communication link). A user may use an input device 109 (e.g., keyboard, mouse, etc.) which is connected to the processing device 107 in order to access the receipt vault 105 and view or manipulate data (e.g., electronic receipts) stored in the vault 105.

It should be noted that the transmission of data between the ERG 101a-101c and the network 103, and between the network 103 and the receipt vault 105 may be either a wired (e.g., local area network (LAN) line, wide area network (WAN) line) or wireless (e.g., wireless telephone, short message service (SMS), bluetooth, near field communication (NFC), ultrawide band (UWB), etc.) communication link.

The processing device 107 may also include the receipt vault 105 or some portion of the receipt vault 105. That is, for example, the data (e.g., receipts) stored in the receipt vault 105 may be stored in a memory device (e.g., random access memory (RAM)) of a customer's blackberry, mobile phone, or personal computer (e.g., processing device 107). That is, although FIG. 1 shows the receipt vault 105 formed separate from the processing device 107, the receipt vault 105 may alternatively be stored in the processing device 107, or may be stored on the server of another network (not shown) to which the processing device 107 is connected. For example, if the processing device 107 is a personal computer, the receipt vault 105 or some portion thereof may reside on the hard drive of the personal computer. Alternatively, the receipt vault 105 may be stored on a central server (e.g., a web server) which is on the network 103.

The processing device 107 may also store a purchase history viewing tool (e.g., a program such as a software application stored on the hard drive of a computer) which is executable for handling and viewing the data (e.g., electronic receipts) stored in the receipt vault 105. A display device 111 (e.g., light-emitting diode (LED) display, liquid crystal display (LCD), cathode ray tube (CRT) display, etc.) may also be connected (e.g., wired or wirelessly connected) to the processing device 107. The processing device 107 may include a processor (e.g., central processing unit (CPU) which executes the instructions of the purchase history viewing tool to generate a graphical user interface (GUI) and cause the display device 111 to display the GUI. A user may use the GUI displayed on the display device 111 to view, handle and/or manipulate the data (e.g., electronic receipts) which is stored in the receipt vault 105.

The processing device 107 may also access map data which is stored in the memory (e.g., hard drive) of the processing device 107 or elsewhere (e.g., on a central server on the network 103). For example, the map data may be included in the purchase history viewing tool that may reside on the hard drive of a customer's computer (e.g., processing device 107). The processing device 107 may use the map data to display a map (e.g., street map, topographical map) of a geographical area such as a city, state, country or continent.

FIGS. 2A-2F provide exemplary display screens 210-260 which may be included in a GUI according to the exemplary aspects of the present invention. As illustrated in FIGS. 2A-2F, the map may be displayed, for example, as part of the GUI displayed on the display device 111.

An important feature of an exemplary aspect of the present invention is that information from the electronic receipt stored in the receipt vault 105 may be displayed with the map to allow a user to view information from the electronic receipt with respect to the map. For example, information from the electronic receipt may be simultaneously displayed with the map and may be displayed beside the map or superimposed on a part of the map.

The present invention may provide a mechanism to allow a customer to electronically store his purchase history across one or more vendors, and to conveniently handle his purchase history such as by displaying the purchase history on a map. On completion of a sale (e.g., shortly before or shortly after the customer pays for the items purchased and sale is completed), a vendor may provide the customer with access to an electronic receipt, which the customer can store in the electronic receipt vault 105. The customer can then use the GUI (e.g., view the display screen 210-260) displayed on the display device 111 and the input device 109 to manipulate (e.g., handle, view, configure, etc.) the data stored in the electronic receipt vault 105 to display receipts on a map based on selection criteria (e.g., user-selected criteria) and filtering (e.g., user-selected filtering) of displayed receipts.

Conventionally, vendors provide a customer with a paper receipt as a record of a sale or transaction. There may be an electronic record of the purchase if the customer makes the purchase with a credit card. The customer can then view the electronic record by logging onto the customer's account with that credit card.

However, the electronic record typically only includes information such as the name of the vendor and the purchase amount and is included in a list in chronological order. That is, the electronic record typically is not searchable, and often includes little or no information regarding the items purchased. Moreover, the electronic record does not include information regarding the location of the vendor. Thus, if the customer desired to view the purchase history on a map, the customer would be required to obtain a street map and physically plot the location on the street map by using a pen or pencil or use a software mapping tool and manually and laboriously geocode each item in the electronic record.

In addition, the electronic record is only for that one credit card. Thus, for example, if a customer uses three credit cards during a weekend trip (e.g., one card to pay for gasoline, a second card to pay for meals and a hotel and a third card to pay for souvenirs), then to view the purchase history for the trip the customer would have to log on to his account on three separate web sites and view the electronic records separately for each of the credit cards.

In contrast, an exemplary aspect of the present invention may provide a customer with an ability to store, search and display receipts electronically which will greatly enhance the customer experience. For example, a customer could conveniently locate a restaurant at which he had dined, or check the amount he had paid for a service for comparison shopping, by using the purchase history viewing tool on the processing device 107 to search through his electronic receipts in the electronic receipt vault 105. Customers may also use the receipts to create new purchase lists. For example a previous receipt from a grocery store may be used to create a shopping list before the next visit to the grocery store. Individual items, a list of items, or a group of items from the previous receipt may be checked off to add them to the shopping list.

The customer may receive the electronic receipt or have the option to receive the receipt electronically and/or on paper. The electronic receipt may be sent from the ERG 101*a*-101*c* to the electronic receipt vault 105 electronically via email, short message service (SMS) or other push technologies. Additionally a paper receipt may be scanned and optical character recognition (OCR) technology used to extract data.

Further, the electronic receipt may comply with the standards for customer invoicing have been developed by groups such as Organization for the Advancement of Structured Information Standards (OASIS) and the Open Applications Group Integration Specification (OAGIS).

The electronic receipt may further adhere to a standard for electronic receipts such as the extensible markup language (XML) or universal business language (UBL).

FIG. 3 illustrates an exemplary XML schema definition 300 of an electronic receipt (e.g., an exemplary XML markup that may define an electronic receipt). In the XML schema definition 300, an electronic receipt may contain information such as the vendor name, address and phone number, the customerID, geocoding information about the vendor's location, the type of receipt (customer receipt, gift receipt, etc.) and information about the receipt's visibility (public, private or limited to a set of people).

The electronic receipt may also contain information about the items purchased (e.g., see FIG. 4). Although most of the information contained in an electronic receipt would be captured at the time the receipt is generated, some of the information may be modified or captured by the customer. For example, the customer may set/modify the visibility of the receipt. The customer may also annotate the receipt at both a receipt and line item level.

The exemplary XML schema definition in FIG. 3 refers to the type "NewLineItem". FIG. 4 illustrates an exemplary XML schema definition (e.g., XML markup) 400 for a line item (e.g., "NewLineItem").

As illustrated in the XML schema definition 400, an electronic receipt may contain an array of line items, with each line item storing information about an item purchased in that transaction. The information stored could be the identification (such as a uniform product code (UPC)), price, quantity sold, description of the item, discounts applied to the item, information regarding the manufacturer, including geocoding information about the place of manufacture, product information and a link to a website for further information on the item (such as dietary/allergy/recall information).

Each line item may also store annotations. A customer could use this field to capture customer specific information about that item. For example, a customer may add comments on a particular dish he ordered at a restaurant. The annotation field may also be modifiable by a customer.

In addition to the geocoding the receipt itself, individual items may be geocoded to indicate their place of manufacture or creation. Additional item specific information may be specified through a hyperlink.

The electronic receipt generated by the ERG (e.g., a customer's purchase history) may be encoded with geographical information (e.g., purchase location information) such as latitude and longitude information derived from the street address of the vendor (e.g., electronic receipt provider). The geographical information may be used in combination with other user-defined criteria to display a customer's purchase history on a map on the display device 111.

Operation

Referring again to FIGS. 2A-2F, the invention may allow the customer to search a purchase history and/or configure the purchase history and the geographical area displayed.

For example, the purchase history to be displayed can be selected based on user input, and the geographical area to be displayed can be selected based on user input. Further, the criteria for selecting the purchase history to be displayed on a map, may be set on the map itself (e.g., superimposed on the map), or may be set outside of the map.

In addition, the criteria for selecting the purchase history to be displayed on a map may be the vendor or provider in the transaction, or the category of vendor or provider in the transaction, or the monetary amount of the transaction. Further, the criteria for selecting the purchase history to be displayed on a map may be determined by a threshold or range for the monetary amount of the transaction, or by the date of the transaction, or by a threshold or range for the date of the transaction, or by the time of the transaction, or by a threshold or range for the time of the transaction, or by the goods and services purchased.

Further, the purchase history displayed on a map may be filtered based on user input, or based on criteria set on the map itself, or based on criteria set outside the map. The criteria for filtering the purchase history displayed on a map may include, for example, the vendor or provider in the transaction, the category of vendor or provider in the transaction, the monetary amount of the transaction, a threshold or range for the monetary amount of the transaction, the date of the transaction, a threshold or range for the date of the transaction, the time of the transaction, a threshold or range for the time of the transaction, or the goods and services purchased.

Figure 2A:
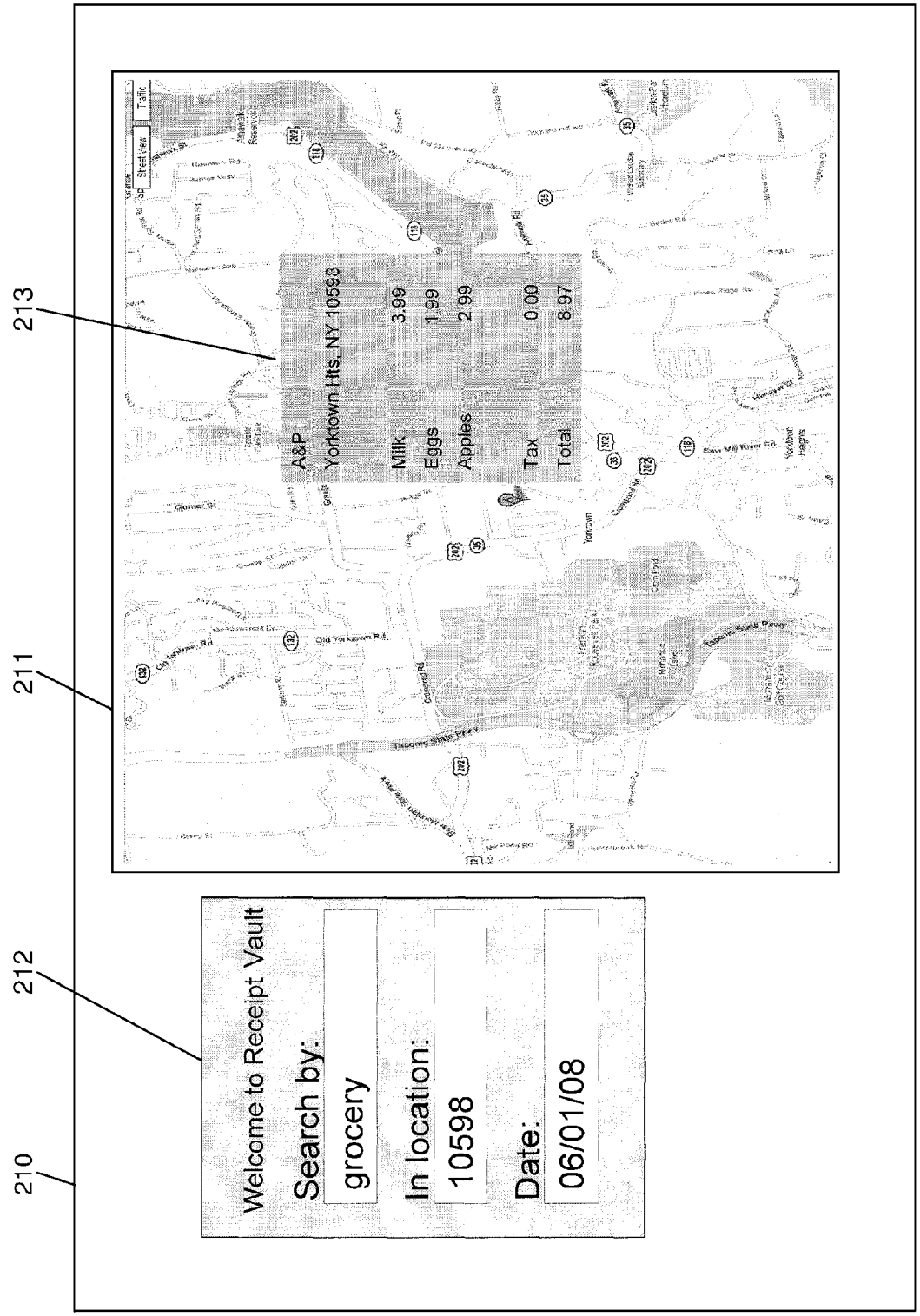
FIGS. 2A-2F illustrate exemplary display screens 210-250 which are part of a graphical user interface (GUI), in accordance with an exemplary aspect of the present invention.

For example, as illustrated in FIG. 2A, the GUI generated by the processing device 107 and displayed on the display device 111 may include a display screen 210 which includes a map 211 and a search region 212 displayed in an area beside the map 211.

In operation, the user may use the input device 109 to type in a keyword (e.g., "grocery" in FIG. 2A) or other search criteria such as location (e.g., by zip code or by direct manipulation of a map) or a date (e.g., a date of purchase). The processing device 107 would then cause the electronic receipts stored in the receipt vault 105 to be searched for an occurrence of that keyword or other search criteria.

In particular, upon entering the information into the processing device 107, the processing device 107 may access map data to generate the map 211 and cause the map to be displayed on the display device 111. The map 211 displayed would be based on the search criteria input to the search region 212. The map 211 may also include a marker such as a "pin" or logo which is located on the map 211 at a precise location of the address (e.g., the vendor's location) which is associated with an electronic receipt returned by the search. The user could then use the input device 109 to move a cursor over the marker (e.g., "pin") which may cause a receipt information box 213 to be displayed on the screen (e.g., superimposed on the map 211, displayed beside the map 211, etc.), the box 213 including information associated with the electronic receipt associated with that marker.

For example, if the user inputs only a keyword such as "grocery" into the search region 212, then the processing device 107 may search the receipt vault 105 to locate any electronic receipts which include the word "grocery", or that include a word which the processing device 107 associates with the term "grocery", such as "bread", "milk", etc.

If the user inputs to the search region 212 only the keyword "grocery" and the search uncovered only two receipts, one receipt which included the word "bread" and the address associated with the purchase that caused that electronic receipt to be generated is in Los Angeles, and one receipt which included the words "Acme Grocery Company" and the address associated with the purchase that caused that electronic receipt to be generated is in Denver, the map 211 displayed may include the western U.S. (e.g., including Los Angeles and Denver), and so forth.

If the user inputs only a zip code (e.g., "10598" in FIG. 2A) into the search region 212, then the map 211 may include that zip code (e.g., primarily that zip code), and the map 211 would include a marker indicating a precise location (e.g., vendor location) for every electronic receipt which is associated with that zip code. If no such receipts are uncovered by the search, then a box may appear superimposed on the map displaying a message to the user that no electronic receipts were uncovered for that zip code search.

The user may also conveniently modify his search criteria by using the input device 109 to zoom and/or pan the map 211. If the user performs such an operation on the map 211, then the user's search query may be re-evaluated (e.g., modified) to present additional receipts that are now relevant to the query and remove any receipts that no longer match the query to reflect the change in the current view of the map.

If the client does not input into the search region 212 a location or keyword but only inputs a purchase date, then the map 211 may include any location where the customer has made a purchase on that day.

The user could also further narrow his search by inputting two or more search criteria. For example, the user could search by keyword and location, or by location and date, or by keyword, location and date, and so on. It should also be noted that the search criteria in FIG. 2A should not be considered as limiting. Indeed, any number of search criteria may be used to search the electronic receipts vault 105.

It should also be noted that the information displayed in the receipt information box 213 is exemplary and should not be considered as limiting. Indeed, other information included in the electronic receipt may be displayed. For example, the vendor's phone number, email address or logo may also be included in the receipt information box 213.

In addition, the electronic receipt information box 213 may include only a summary of the data associated with that receipt. That is, there may be data associated with that electronic receipt that is not included in the electronic receipt information box 213. In that case, the user may "click on" the electronic receipt box 213 in order to access that information associated with that electronic receipt. Clicking on the receipt information box 213 may cause a larger and more detailed version of the receipt information box 213 to appear. For example, the user may click on the electronic receipt information box 213 in FIG. 2A to learn the exact time that the user purchased the milk, eggs and apples from A&P.

Further, if a user clicks on the information in the receipt information box 213, the purchase history search tool may search the receipt vault 105 for that information. For example, in FIG. 2A, if the user clicks on "A&P", the tool may search the vault 105 for any receipts that include the vendor A&P in the last 6 months, and then display the results of the search in the form of a list. If the user clicks on "milk", the tool may search the vault 105 for any receipts in which milk was purchased in the last 6 months, and display the results in the form of a list.

Receipts may be optionally be updated with live information before they are displayed in the electronic receipt information box 103. The receipt viewer (e.g., purchase history viewing tool) may optionally contact the vendor database 102 to determine if any new information is available on the item and update the information displayed in the electronic receipt information box 103 accordingly. For example, items that have been recalled by the manufacturer can be highlighted in a different color.

In addition, the receipt viewer may obtain a customer rating for an item from the vendor database 102 and update the information displayed for that item in the information box 103 accordingly. The purchaser may optionally be able to select (e.g., "click on") an item in the information box 103 in order to rate that item and send his rating information back to the vendor database 102. As an incentive, providing such rating information may in some cases lead to a discount on a future purchase of the item. The user can also use the information box 103 to annotate an electronic receipt or an item therein with a personal note for his future reference. For example, if an entrée at a restaurant was of poor quality the user may enter a rating for the restaurant, text describing the restaurant, or other media comment.

In addition, the user could use the input device 109 to adjust the settings of the tool in order to vary the manner in which the search results are displayed. For example, the user could adjust the settings so that if the user clicks on "A&P", the tool may search the vault 105 for any receipts that include the vendor A&P in the last 30 days or year. The user could also adjust the settings to that the results are not reported in the form of a list, but in the form of a bar chart, pie chart, etc.

In addition, the user could use the input device 109 to adjust the settings of the tool in order to vary the search criteria. For example, as illustrated in the exemplary aspect of FIG. 2B, the settings could be adjusted so that the search region 222 of the display screen 220 includes search criteria including a keyword search, store name and location. In addition, in this exemplary aspect, the search criteria in the search region 222 may be adjusted by inputting a "search by" category such as a store or product. These categories may be selected from a "pull down" menu which the user may cause to appear by moving the cursor over or clicking on the "search by" space in the search region 222.

Figure 2B:
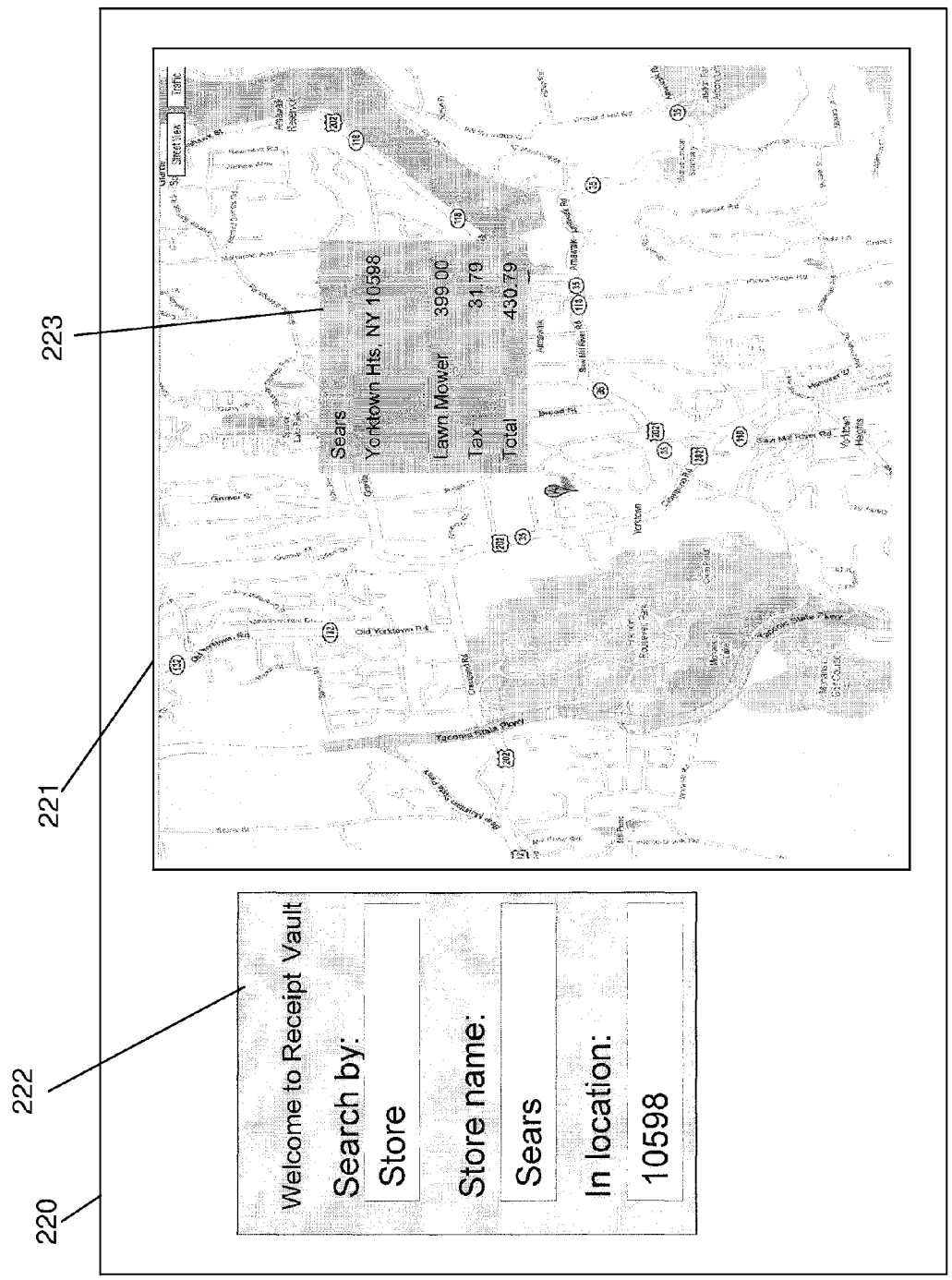

For example, as illustrated in FIG. 2B, the user may input "store" as the "search by" category in which case, the tool would cause the search region 222 to display the "store name" and "location" spaces. Thus, for example, if the user input "Sears" in the store name space and "10598" in the location space, the tool would generate a map 221 with markers indicating a location associated with an electronic receipt for a purchase at a Sears store in the location 10598, and the user could move the cursor over the marker to generate the electronic receipt information box 223.

Figure 2C:
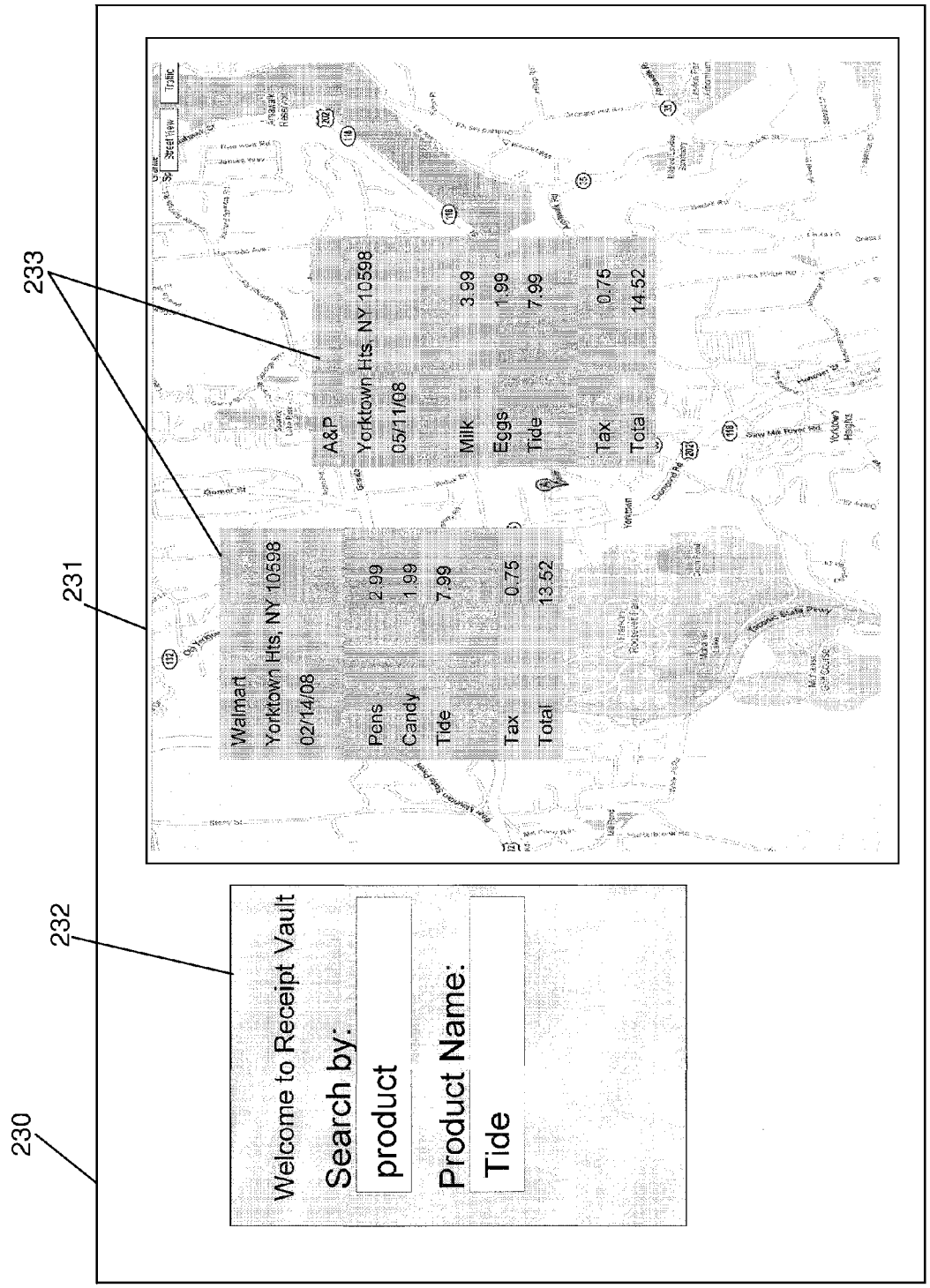

As illustrated in the exemplary display screen 230 in FIG. 2C, the user may input "product" as the "search by" category, in which case, the tool would cause the search region 232 to display a "product name" space. Thus, for example, if the user input "Tide" in the product name space and "10598", the tool would generate a map 231 with markers indicating a location associated with an electronic receipt for a purchase of the product "Tide", and the user could move the cursor over the marker to generate the electronic receipt information boxes 233.

Figure 2D:
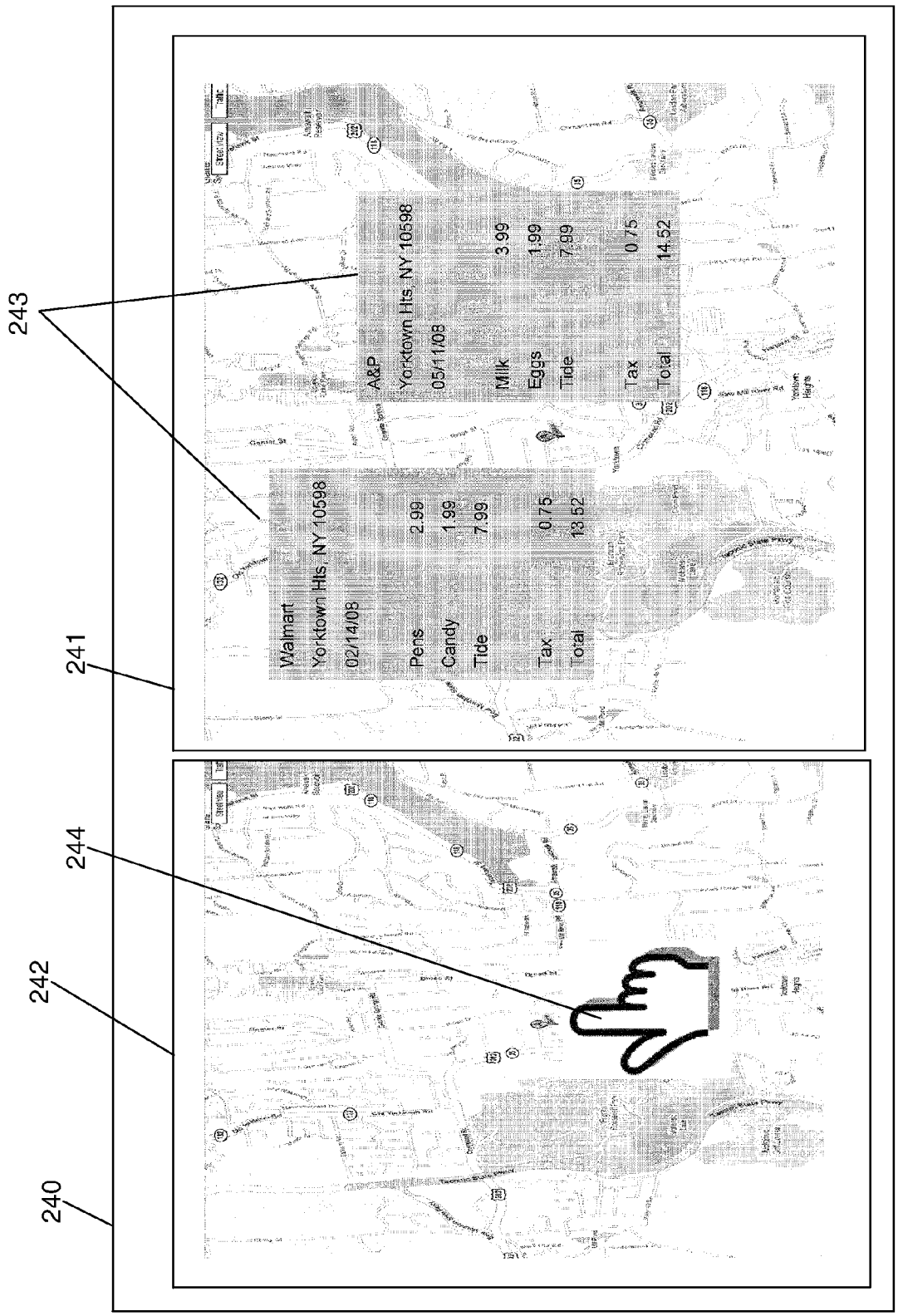

As illustrated in the exemplary display screen 240 in FIG. 2D, the search region 242 may be displayed as a search map which includes a marker (e.g., pin) for identifying a location associated with an electronic receipt stored in the vault 105. For example, the user may use the input device 109 and click on a location indicator 244 (e.g., a pointing finger) to move the indicator 244 to a location and perform a search of the receipt vault 105 for electronic receipts associated with that location, and generate the receipt information boxes 243 for those receipts on the map 241.

In the exemplary aspect of FIG. 2D, a user has moved the indicator 244 over "pin A", which has caused the tool to display a receipt information box 243 for an electronic receipt for a purchase at the store Walmart and a receipt information box 243 for an electronic receipt for a purchase at the store A&P. This may indicate that these purchases were made at a Walmart and A&P located at marker "A" on the map 241.

Figure 2E:
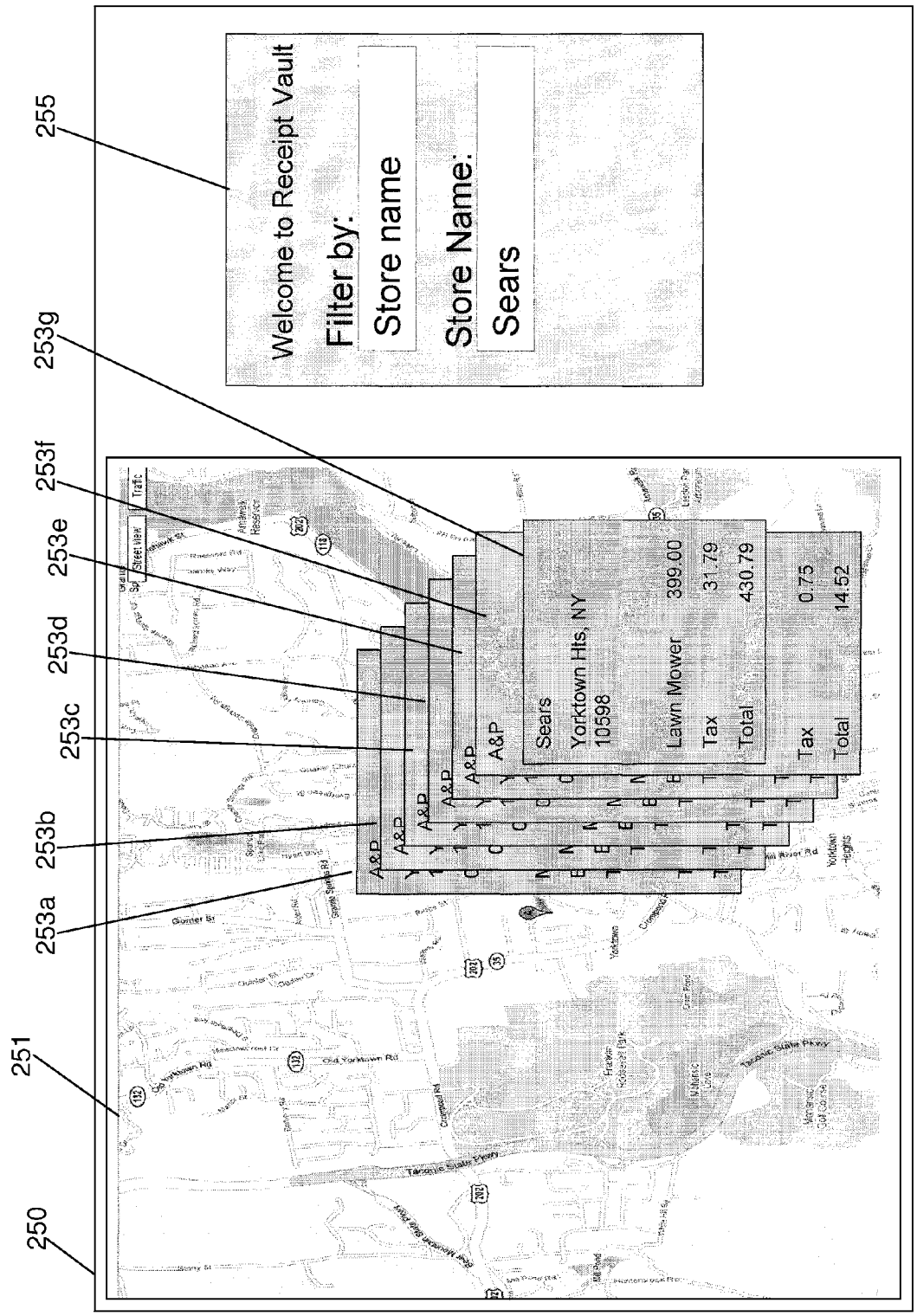
Figure 2F:
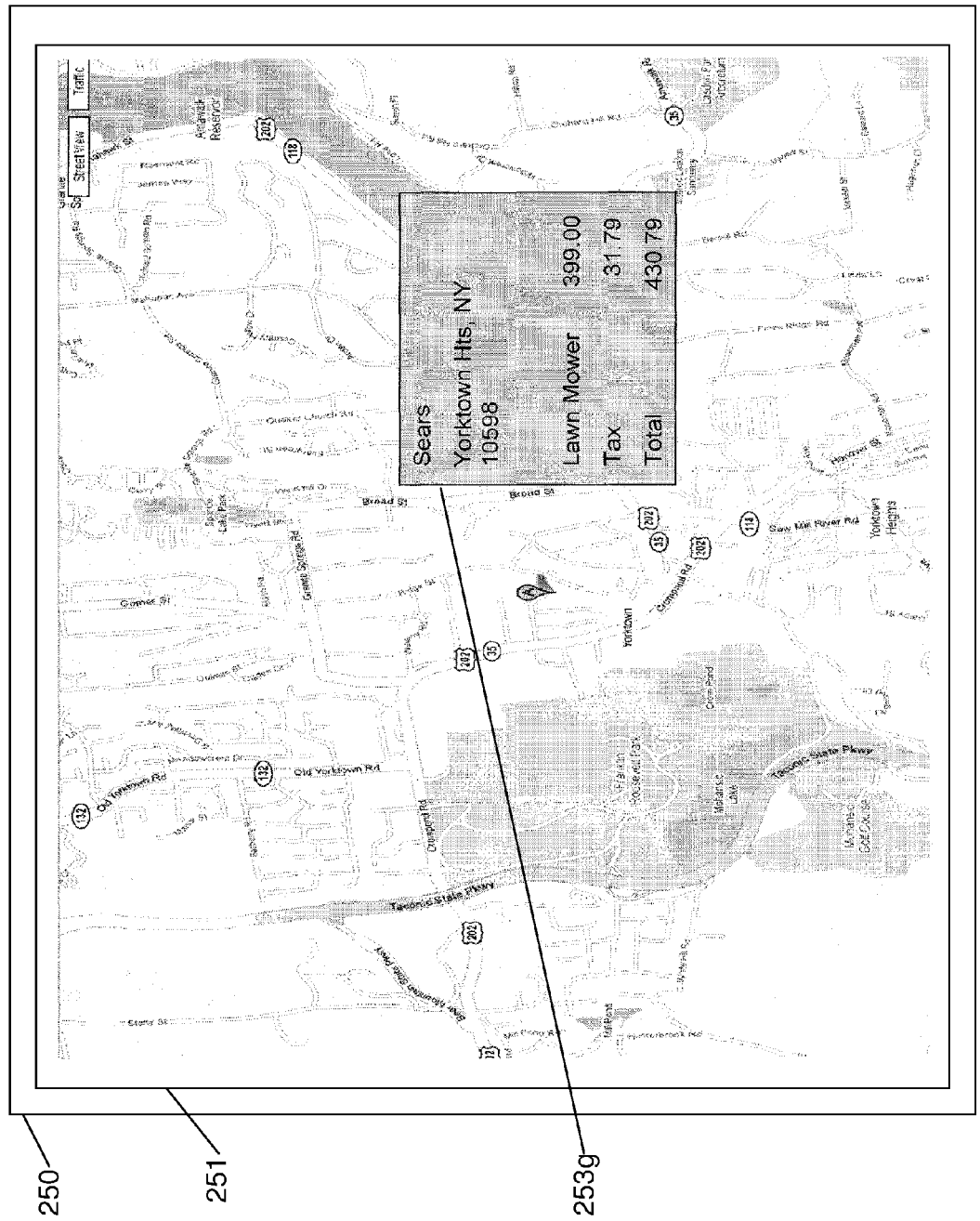

FIGS. 2E and 2F illustrate a filtering mechanism that may be provided in the purchase history viewing tool. For example, after a user has performed a search using the tool, the user may then filter the results of the search in order to focus on a particular aspects of the results. For example, as illustrated in FIG. 2E, if the user performs a search that returns seven (7) electronic receipts, as indicated by the electronic receipt information boxes 253a-253g displayed on the map 251 of display screen 250, the user may filter these results by opening the filtering box 255 (e.g., by right clicking on the map, by selecting "filtering tool" from a menu displayed by the GUI, etc.).

The filter box 255 may include a "filter by" space in which the user may enter a category (e.g., store name) or select a category from a drop down menu. Thus, for example, if the user selects "store name" as the filtering category, then the store name space may appear in the filter box 255. Then, the user may enter the store name in the filter box 255 to filter the results of the most recent search (e.g., the search which returned the results including the receipt information boxes 253a-253g).

For example, in FIG. 2E, the user has input the store name Sears in the filter box 255 which may cause the purchase history viewing tool to generate the display screen 250 including only electronic receipt information box 253g on the map 251. That is, the tool has deleted receipt information boxes 253a-253f from display screen 250 since those boxes did not correspond to an electronic receipt that was associated with the store name Sears.

Figure 5:
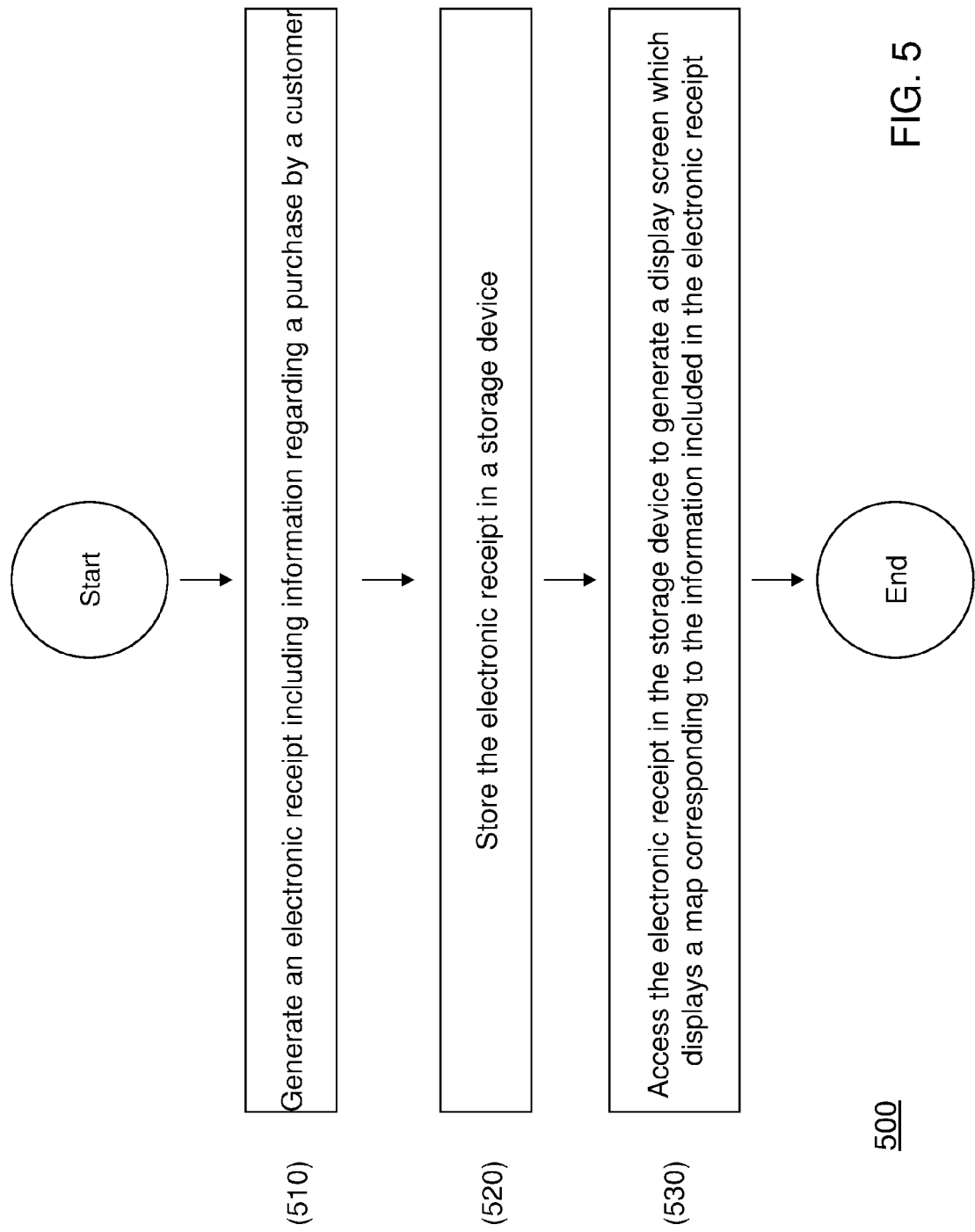
FIG. 5 illustrates a method 500 of generating a view of a purchase history, in accordance with an exemplary aspect of the present invention.

FIG. 5 illustrates a method 500 of generating a view of a purchase history, according to an exemplary aspect of the present invention. The method 500 includes generating (510) an electronic receipt including information regarding a purchase by a customer, storing (520) the electronic receipt in a storage device, and accessing (530) the electronic receipt in the storage device to generate a display screen which displays a map corresponding to the information included in the electronic receipt.

The present invention may be used for example, by employers, employees, credit card companies, law enforcement personnel, parents, vendors and consumers.

For example, the purchase history viewing tool may include (e.g., or be linked to) an expense report generator. This may allow an employee to use the viewing tool to use the electronic receipts (e.g., geotagged electronic receipts) to automatically fill in fields in an expense report which is to be provided to the employee's employer for reimbursement.

An employer may use the tool to determine whether an employee's corporation-issued credit card is being used for improper purchases. The employer may also use the tool to conveniently detect a correlation between travel expenses and locations where purchases have incurred.

For example, an employer may use to tool to determine that a large percentage of purchases are made at a particular vendor (e.g., a particular restaurant or restaurant chain or hotel or hotel chain) by employees while on travel to a particular city, state, country or continent. The tool would allow the employer to conveniently determine an total amount of purchases made so that the employer could use this information to negotiate a discount with the vendor for the employees of the employer.

The present invention may also include a fraudulent purchase detector for detecting fraudulent credit card purchases. Credit card companies, merchants and card holders are constantly battling identity and credit card theft. Merchants are encouraged to employ Address Verification Systems (AVS), to cross-check billing addresses with shipping addresses. An example of AVS at work is asking a customer to input their billing zip code as identity verification, on the premise that someone using a stolen credit card is less likely to have access to that information.

Thus, the present invention may be a valuable tool for credit card companies, merchants, card owners and law enforcement. The ability to geo-code receipts and display them on a map provides an easy-to-use visual tool to monitor purchasing history patterns. A cash register clerk at a retail store can use the present invention to monitor transactions for a particular credit card and flag suspicious activity.

The present invention may be used to provide some parental control on a child's credit card use. Parents often provide a credit card to a child who is away at college. The present invention may allow a parent to quickly (e.g., instantly)

receive and monitor credit card spending by a child. Receipts are viewable by geography, allowing easy monitoring of credit card spending in different locations. Further, the concept of a receipt vault allows parents to see receipts across vendors instantly in one application.

Thus, currently a parent may log onto the web page of the credit card company to review the purchases by the child with his credit card. However, the record may only indicate that the child made a purchase of $50.00 at a retail store such as Walmart or Target. The record does not indicate what items were purchased with that $50.00. The present invention, on the other hand, may allow the parent to learn the items (e.g., beer, home pregnancy test kit, etc.) that were purchased by the child.

Another valuable use of the present invention is in comparison shopping. That is, the user may enter a keyword search for "milk" which returns four (4) different electronic receipts over the past month, from four different vendors. The user could then compare the information from the electronic receipt information boxes displayed by the purchase history search tool, to conveniently compare the prices and determine the lowest priced vendor.

Further, the present invention may allow a user to elect to maintain all or a portion of their purchase history. The user may also elect to share all or a portion of their purchase history with others such as friends, family or the general public.

Thus, for example, a user may elect to share with his friends, the user's purchase history for gasoline purchases and grocery purchases but not for other purchases. In this case, for gasoline and grocery purchases, the ERG 101 may detect such a setting in use's purchase history viewing tool and generate a duplicate electronic receipt which is sent to a storage device which is accessible by the user's friends. This would allow the user's friends to comparison shop by using the user's purchase history as well as the user's friends' purchase history. Alternatively, the ERG 101 may generate only one electronic receipt to send to user, and upon receiving the receipt, the tool may detect that the receipt is for a gasoline purchase and automatically generate a duplicate of the receipt which is then sent from the user to the user's friends.

In addition, the law may require that certain purchases will automatically generate a duplicate electronic receipt. For example, a purchase of certain medications (e.g., narcotics), guns, ammunition or explosive ingredients (e.g., fertilizer, ammonia, etc.) or ingredients commonly used to make recreational drugs (e.g., methamphetamines) may automatically generate a duplicate electronic receipt that may be accessible by law enforcement.

The present invention may also be used to generate a gift receipt for the recipient of a gift. That is, when the gift is purchased, the purchaser may indicate to the vendor that the product purchased is a gift, and the vendor may input the gift recipient's email address or phone number, so that the electronic receipt is sent to the purchaser of the gift and a duplicate electronic receipt is sent to the gift recipient.

Figure 6:
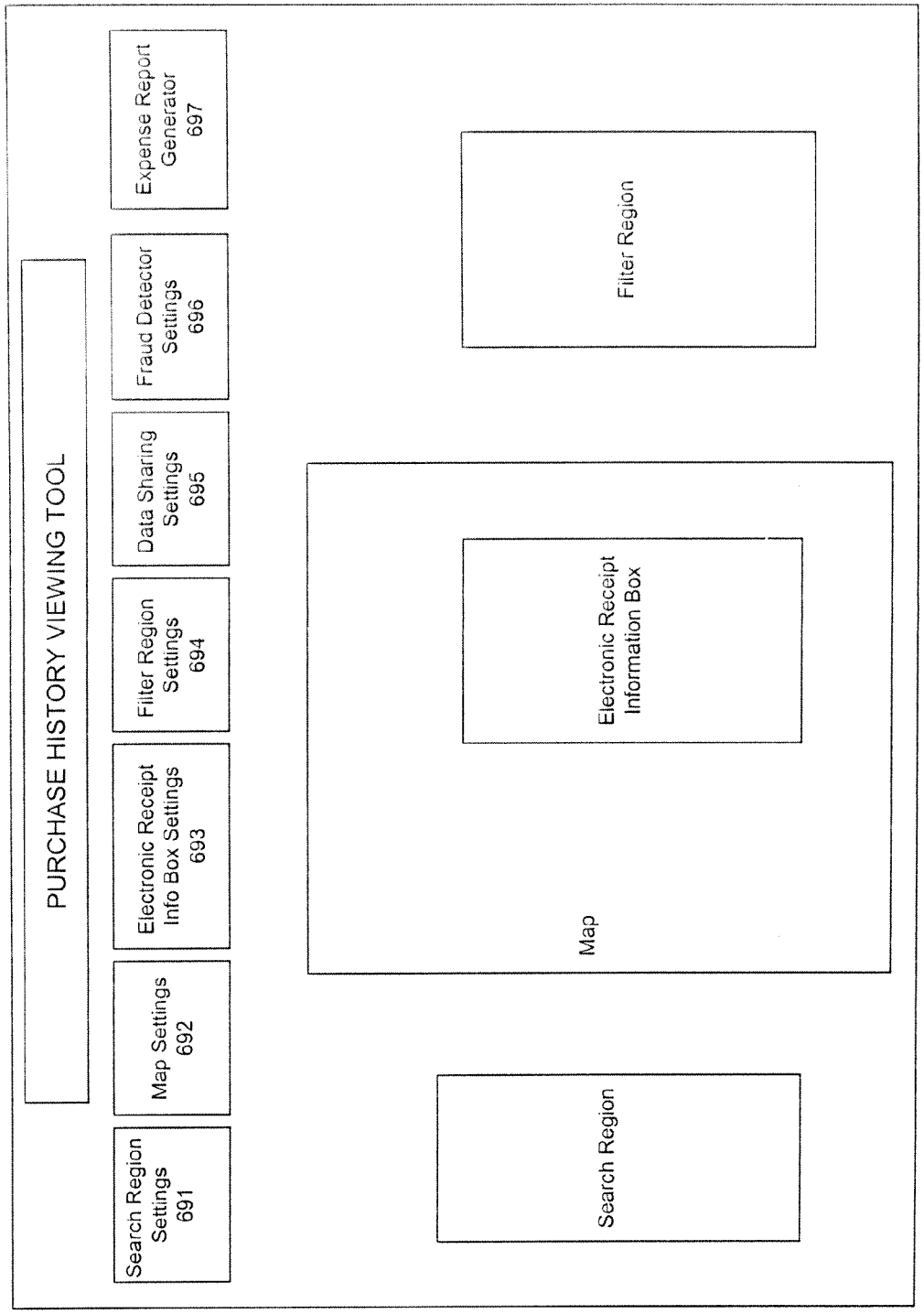
FIG. 6 illustrates an display screen 600 for a purchase history viewing tool, in accordance with an exemplary aspect of the present invention.

FIG. 6 illustrates a display screen 600 for a purchase history viewing tool, according to an exemplary aspect of the present invention. The display screen 600 may be used, for example, to adjust the settings for the purchase history viewing tool.

For example, the screen 600 may include a Search Region Settings button 691. The user may click on (or move the cursor over) the button 691 to cause a new screen or a drop down menu to be displayed which includes a list of features (e.g., search criteria) which the user may select (e.g., by clicking on a box) to include in the Search Region, or deselect (e.g., by clicking on a box) to omit from the Search Region. The screen 600 may also a Map Settings button 692, an Electronic Receipt Information Box Settings button 693, a Filter Region Settings button 694, and a Data Sharing Settings button 695 which the user may also use similarly to the button 691, in order to adjust the settings of the respective features.

The screen 600 may also include a Fraud Detector Settings button 696 which the user may click on (or move the cursor over) to cause a new screen to be displayed which includes a list of features which the user may select (e.g., by clicking on a box) to include in the fraud detector of the purchase history viewing tool of the present invention. For example, if the user clicks on button 696 the tool may display a new screen which lists features for allowing the user to control the fraud detector. For example, in the new screen, the user could input keywords or geographic information for the tool to detect in the electronic receipts which may alert the user to some fraudulent use of the user's credit card information.

The screen 600 may also include an Expense Report Generator button 697 which the user may click on (or move the cursor over) to cause a new screen to be displayed which includes a list of features which the user may select (e.g., by clicking on a box) to include in an expense report using the purchase history viewing tool of the present invention. For example, in the new screen, the user could select certain purchases (e.g., a purchase of office supplies, purchases in a particular geographic region, dinner at a particular restaurant, purchases on a particular credit card, etc.) that may automatically be added to an expense report. The user may also select a period for automatically generating an expense report and forwarding it to the appropriate office for seeking reimbursement.

For example, if the user selects "monthly", each month the expense report generator may generate an expense report and forward it (e.g., in an email) to the user for his review. The email may include a link which the user may click on (e.g., after he has confirmed that the expense report is correct) in order to forward the expense report for reimbursement.

Figure 7:
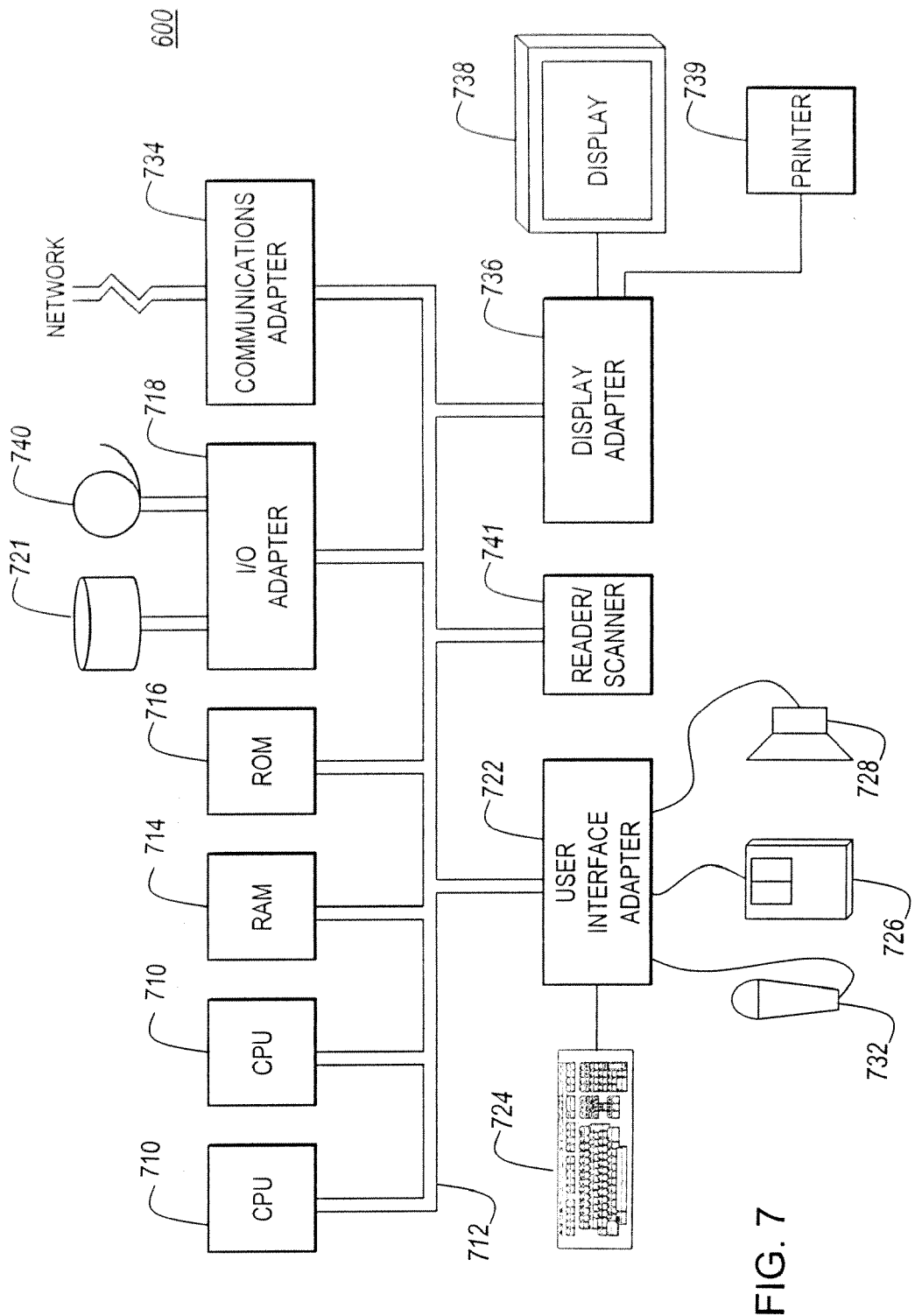
FIG. 7 illustrates a typical hardware configuration 400 that may be used to implement the system 100 and method 500, in accordance with an exemplary aspect of the present invention.

Referring now to FIG. 7, system 700 illustrates a typical hardware configuration which may be used for implementing the inventive cursor control system and method of controlling a cursor. The configuration has preferably at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, pointing stick 727 and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 711 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 711 and hardware above, to perform the method of the invention.

This signal-bearing media may include, for example, a RAM contained within the CPU 711, as represented by the fast-access storage for example. Alternatively, the instructions may be contained in another signal-bearing media, such as a magnetic data storage diskette 800 or compact disc 802 (FIG. 8), directly or indirectly accessible by the CPU 711.

Whether contained in the computer server/CPU 711, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as C, C+, etc.

With its unique and novel features, the present invention provides a system and method of viewing a purchase history which is more efficient and convenient than conventional systems and methods.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A system for generating a view of a purchase history, comprising:
   an electronic receipt generator (ERG) for generating an electronic receipt including information regarding a purchase by a customer;
   a storage device for storing a purchase history for the customer and said electronic receipt for each purchase in said purchase history; and
   a display screen generator which accesses said electronic receipt in said storage device to generate a display screen which displays said electronic receipt with a map corresponding to the information included in the electronic receipt, wherein at least a portion of said electronic receipt is overlaid on said map; and
   a shared storage device, accessible by the customer and at least one additional authorized user, for storing a duplicate copy of said electronic receipt for at least a portion of purchases in said purchase history;
   wherein said display screen further displays said information included in said electronic receipt, said information comprising at least one of a vendor name, customer name, an item purchased, an amount paid for said item purchased, a date of said purchase, a time of said purchase, an address of said vendor, a phone number of said vendor and an email address of said vendor, and additional item information; and
   wherein said electronic receipt generator comprises plural electronic receipt generators which are associated with a vendor, and said electronic receipt comprises plural geotagged electronic receipts which are encoded with a location of said vendor.

2. The system of claim 1, wherein said display screen further displays a search region for inputting search criteria for causing said display screen generator to search data stored in said plural geotagged electronic receipts.

3. The system of claim 2, wherein said search criteria comprises at least one of a keyword, an amount paid for said purchase, a range of amounts paid for said purchase, a date of said purchase, a range of dates for said purchase, a time of said purchase, a range of times for said purchase, a location of said purchase, and an item purchased.

4. The system of claim 2, wherein said map comprises a marker associated with an electronic receipt returned by a search, and indicating at a location of an address which is associated with said electronic receipt returned by a search.

5. The system of claim 4, wherein said information included in said electronic receipt is displayed by said user selecting said marker by one of clicking on said marker and moving a cursor over said marker.

6. The system of claim 2, wherein said information included in said electronic receipt comprises a hyperlink.

7. The system of claim 6, wherein selecting said hyperlink causes said display screen generator to at least one of:
   display additional information included in said electronic receipt; and
   perform another search of data stored in said plural geotagged electronic receipts based on said hyperlink.

8. The system of claim 2, wherein said search region comprises a search map and a location indicator for indicating a location on said search map for performing a search.

9. The system of claim 2, wherein said display screen further displays a filter region for inputting filtering criteria for filtering said plural geotagged electronic receipts which are returned by a search of said data stored in said plural geotagged electronic receipts.

10. The system of claim 9, wherein said filtering criteria comprises at least one of a keyword, an amount paid for said purchase, a date of said purchase, a time of said purchase, a location of said purchase, and an item purchased.

11. The system of claim 1, wherein said electronic receipt comprises one of a shared receipt and a gift receipt and is transmitted from said ERG to an entity other than said customer.

12. The system of claim 1, wherein said display screen generator comprises one of a camera, mobile phone, desktop computer, laptop computer, handheld device, personal digital assistant (PDA), and Blackberry device.

13. The system of claim 1, wherein said the ERG transmits said electronic receipt to said storage device via one electronic mail based on an email address provided to said vendor by said customer, and short message service (SMS) based on a phone number provided to said vendor by said customer, and wherein said electronic receipt generator is located near a point of sale terminal of a vendor and generates said electronic receipt at a time of said purchase by said customer.

14. The system of claim 1, further comprising:
an input device which is connected to said display screen generator for one of manipulating and viewing data stored in said storage device and displayed on said display screen.

15. The system of claim 14, wherein said manipulating said data comprises at least one of making a personal annotation on an electronic receipt, making a personal annotation on a portion of an electronic receipt, making a shared annotation on an electronic receipt, making a shared annotation on a portion of an electronic receipt, and making one of an electronic receipt and a portion of an electronic receipt accessible to another entity.

16. The system of claim 1, further comprising:
an expense report generator for generating an expense report based on said plural geotagged electronic receipts.

17. The system of claim 1, further comprising:
a fraudulent purchase detector for detecting a fraudulent purchase based on said plural geotagged electronic receipts.

18. A system for generating a view of a purchase history, comprising:
plural electronic receipt generators (ERGs) for generating plural geotagged electronic receipts including information regarding a purchase by a customer;
a storage device for storing said plural geotagged electronic receipts; and
a display screen generator which accesses said plural geotagged electronic receipts in said storage device to generate a display screen which displays:
a map corresponding to the information included in the plural geotagged electronic receipts;
a search region for inputting search criteria for causing said display screen generator to search data stored in said plural geotagged electronic receipts, said search criteria comprising at least one of a keyword, an amount paid for said purchase, a date of said purchase, a time of said purchase, a location of said purchase, and an item purchased;
said information included in said plural geotagged electronic receipts, said information comprising at least one of a vendor name, an item purchased, an amount paid for said item purchased, a date of said purchase, a time of said purchase, an address of said vendor, a phone number of said vendor and an email address of said vendor; and
a filter region for inputting filtering criteria for filtering said plural geotagged electronic receipts which are returned by a search of said data stored in said plural geotagged electronic receipts, said filtering criteria comprising at least one of a keyword, an amount paid for said purchase, a range of amounts paid for said purchase, a date of said purchase, a range of dates for said purchase, a time of said purchase, a range of times for said purchase, a location of said purchase, and an item purchased,
wherein said information included in said plural geotagged electronic receipts is overlaid on said map on said display screen,
wherein said display screen further displays a search region for inputting search criteria for causing said display screen generator to search data stored in said plural geotagged electronic receipts, said search criteria comprising at least one of a keyword, an amount paid for said purchase, a date of said purchase, a time of said purchase, a location of said purchase, and an item purchased,
wherein said map comprises a marker associated with an electronic receipt returned by a search, and indicating at a location of an address which is associated with said electronic receipt returned by a search, and said information included in said electronic receipt is displayed by said user selecting said maker by one of clicking on said marker and moving a cursor over said marker, and
wherein said information included in said electronic receipt comprises a hyperlink, and selecting said hyperlink causes said display screen generator to at least one of:
display additional information included in said electronic receipt; and
perform another search of data stored in said plural geotagged electronic receipts based on said hyperlink.

19. A method of generating a view of a purchase history, comprising:
generating an electronic receipt including information regarding a purchase by a customer;
storing a purchase history for the customer and said electronic receipt for each purchase in said purchase history in a storage device;
accessing said electronic receipt in said storage device to generate a display screen which displays said electronic receipt with a map corresponding to the information included in the electronic receipt; and
providing access to a user, other than the customer, to at said electronic receipt for at least a portion of purchases in said purchase history,
wherein at least a portion of said electronic receipt is overlaid on said map;
wherein said display screen further displays said information included in said electronic receipt, said information comprising at least one of a vendor name, customer name, an item purchased, an amount paid for said item purchased, a date of said purchase, a time of said purchase, an address of said vendor, a phone number of said vendor and an email address of said vendor, and additional item information; and
wherein said electronic receipt generator comprises plural electronic receipt generators which are associated with a vendor, and said electronic receipt comprises plural geotagged electronic receipts which are encoded with a location of said vendor.

20. The method of claim 19, wherein said display screen further displays a search region for inputting search criteria for causing said display screen generator to search data stored in said plural geotagged electronic receipts, said information included in said plural geotagged electronic receipts, and a filter region for inputting filtering criteria for filtering said plural geotagged electronic receipts which are returned by a search of said data stored in said plural geotagged electronic receipts.

21. A programmable storage medium tangibly embodying a program of machine-readable instructions executable by a digital processing apparatus to perform a method of generating a view of a purchase history, said method comprising:
generating an electronic receipt including information regarding a purchase by a customer;

storing a purchase history for the customer and said electronic receipt for each purchase in said purchase history in a storage device; and accessing said electronic receipt in said storage device to generate a display screen which displays said electronic receipt with a map corresponding to the information included in the electronic receipt; and providing access to a user, other than the customer, to at said electronic receipt for at least a portion of purchases in said purchase history, wherein at least a portion of said electronic receipt is overlaid on said map;

wherein said display screen further displays said information included in said electronic receipt, said information comprising at least one of a vendor name, customer name, an item purchased, an amount paid for said item purchased, a date of said purchase, a time of said purchase, an address of said vendor, a phone number of said vendor and an email address of said vendor, and additional item information; and wherein said electronic receipt generator comprises plural electronic receipt generators which are associated with a vendor, and said electronic receipt comprises plural geotagged electronic receipts which are encoded with a location of said vendor.

22. The method of claim 21, further comprising:

deploying computing infrastructure in which computer-readable code is integrated into a computing system, such that said code and said computing system combine to perform said generating an electronic receipt including information regarding a purchase by a customer, said storing said electronic receipt in a storage device, and accessing said electronic receipt in said storage device to generate a display screen which displays a map corresponding to the information included in the electronic receipt.

23. The system of claim 1, wherein said display screen further displays said information included in said electronic receipt, said information comprising an item purchased and an amount paid for said item purchased.

* * * * *